United States Patent [19]
Kottke

[11] Patent Number: 5,217,605
[45] Date of Patent: Jun. 8, 1993

[54] PORTABLE MULTI-ELEMENT ELECTRIC DISCHARGE MACHINE FILTER SYSTEM

[76] Inventor: Gordon V. Kottke, 6000 Parkview Rd., Greendale, Wis. 53129

[21] Appl. No.: 763,361

[22] Filed: Sep. 20, 1991

[51] Int. Cl.⁵ .............................. B01D 29/52
[52] U.S. Cl. ................... 210/120; 210/241; 210/253; 210/335; 210/445; 210/452
[58] Field of Search .............. 210/120, 237, 238, 241, 210/251, 253, 258, 333.2, 335, 323.1, 416.5, 445, 451, 452, 453, 454, 455; 137/876, 887; 251/89.5, 149.9

[56] References Cited

U.S. PATENT DOCUMENTS

| | | | |
|---|---|---|---|
| 1,962,463 | 6/1934 | Renfrew | 210/241 |
| 2,426,817 | 8/1947 | Charlton | 51/267 |
| 3,160,587 | 12/1964 | Waring | 210/116 |
| 3,455,457 | 7/1969 | Popelar | 210/168 |
| 3,720,322 | 3/1973 | Harms | 210/238 |
| 3,841,488 | 10/1974 | Yessaian | 210/168 |
| 4,028,247 | 6/1977 | Yessaian | 210/153 |
| 4,049,548 | 9/1977 | Dickerson | 210/241 |
| 4,071,451 | 1/1978 | Wood | 210/79 |
| 4,139,464 | 2/1979 | Coward | 210/74 |
| 4,187,179 | 2/1980 | Harms | 210/238 |
| 4,298,469 | 11/1981 | LeBlanc | 210/168 |
| 4,325,663 | 4/1982 | Lee | 409/136 |
| 4,361,488 | 11/1982 | White | 210/776 |
| 4,383,920 | 5/1983 | Muller et al. | 210/241 |
| 4,422,931 | 12/1983 | Wolde-Michael | 210/168 |
| 4,440,642 | 4/1984 | Frese | 210/387 |
| 4,443,334 | 4/1984 | Shugarman et al. | 210/120 |
| 4,636,317 | 1/1987 | Lewis | 210/748 |
| 4,655,940 | 4/1987 | Harms | 210/805 |
| 4,664,798 | 5/1987 | Bergh | 210/241 |
| 4,772,402 | 9/1988 | Love | 210/804 |
| 4,887,644 | 12/1989 | Jeromson et al. | 251/148 |
| 4,905,965 | 3/1990 | Dolev | 251/149.9 |
| 4,966,693 | 10/1990 | Brandt | 210/195.2 |

Primary Examiner—Robert A. Dawson
Assistant Examiner—David Reifsnyder
Attorney, Agent, or Firm—James A. Wilke

[57] ABSTRACT

A system for filtering electric discharge machine dielectric fluid wherein the filtering apparatus is mounted on a moveable platform and attached to the electric discharge machine that needs it's dielectric fluid filtered of foreign matter. The filter system has a plurality of filter casings connected in parallel by each casings inlet and outlet fittings. Each filter casing consists of a tank having a removable lid and a replaceable filter element inside the tank. The fluid flows into the filter tank, through the filter element, into a perforated tube and out of the filter tank into the interconnecting piping system. The filter system is separate from the reserve dielectric fluid tank of the electric discharge machine and can be operated either with the reserve tank system or connected directly to the electric discharge machine.

5 Claims, 2 Drawing Sheets

PORTABLE MULTI-ELEMENT ELECTRIC DISCHARGE MACHINE FILTER SYSTEM

FIELD OF THE INVENTION

The invention relates to a portable, multi-element filter system. More particularly, the invention relates to a portable, multi-element parallel canister filter apparatus and method for filtering cutting swarf from the dielectric fluid used in wire electric discharge machines.

BACKGROUND OF THE INVENTION

Metal cutting machines typically require a fluid to be used with the metal cutting-tool both as a lubricant and a coolant. During the metal cutting process that fluid accumulates metal cutting or swarf that must be removed from the fluid periodically. In the case of electric discharge machines, and particularly those using wire as a cutting tool, a fluid is used as a dielectric and must be electrically neutral in order for the electric discharge machine to operate properly and accurately. Electric discharge machines typically have a filter reservoir through which the dielectric fluid is filtered. Such filters are usually stationary, open to the air and have metal filter elements. The filters must be cleaned periodically of the swarf accumulated on the filter elements.

One major problem with the current filtering system is that during the filter cleaning procedure the electric discharge machine must be stopped and the cleaning procedure is a time consuming process. The longer the machine is not running, the less productive that machine is for its owner.

Another problem experienced in the industry is that during the procedure of removing the filter element from the open, filter reservoir some of the metal swarf falls off the filter element and back into the dielectric fluid thereby reducing the previous achieved degree of purity of that fluid.

Another problem encountered is that each electric discharge machine has to have a filter reservoir next to the machine. This not only takes up valuable floor space but also limits the ability of the machine operator from maneuvering various related machinery near the electric discharge machine.

SUMMARY OF THE INVENTION

The present invention provides a portable multi-element filtering system for use with an electric discharge machine (EDM). The purpose of the invention is to filter the dielectric fluid used with the EDM thereby removing the metal cutting swarf from the dielectric fluid. Six separate canisters, each containing a five micron paper filter, are connected in parallel to form a multi-element filter system. The filter system is connected to the EDM by a pair of hoses having quick change shut off valves.

One important aspect of the present invention is that the filter system is separate from the reserve dielectric fluid tank.

Another important object of the invention is that the filter system can be quickly connected and disconnected to the EDM thereby keeping the productivity of that EDM machine high.

Another object of the invention is to provide a filtering system that is portable and easily moved from one EDM machine to another or easily moved to an area where the filter elements in the canisters can be replaced.

Another object of the invention is to provide a simple method of changing filter elements without contaminating the clean dielectric fluid and easily disposing of the dirty filter element in an environmentally safe manner.

Another object of the invention is to provide multiple, disposable filters that are more economical than one large metal filter in a filter system for EDM dielectric fluid.

These and other features and advantages of the invention will become apparent to those of ordinary skill in the art upon review of the following description reference being made to the appended drawings.

Figure 1:
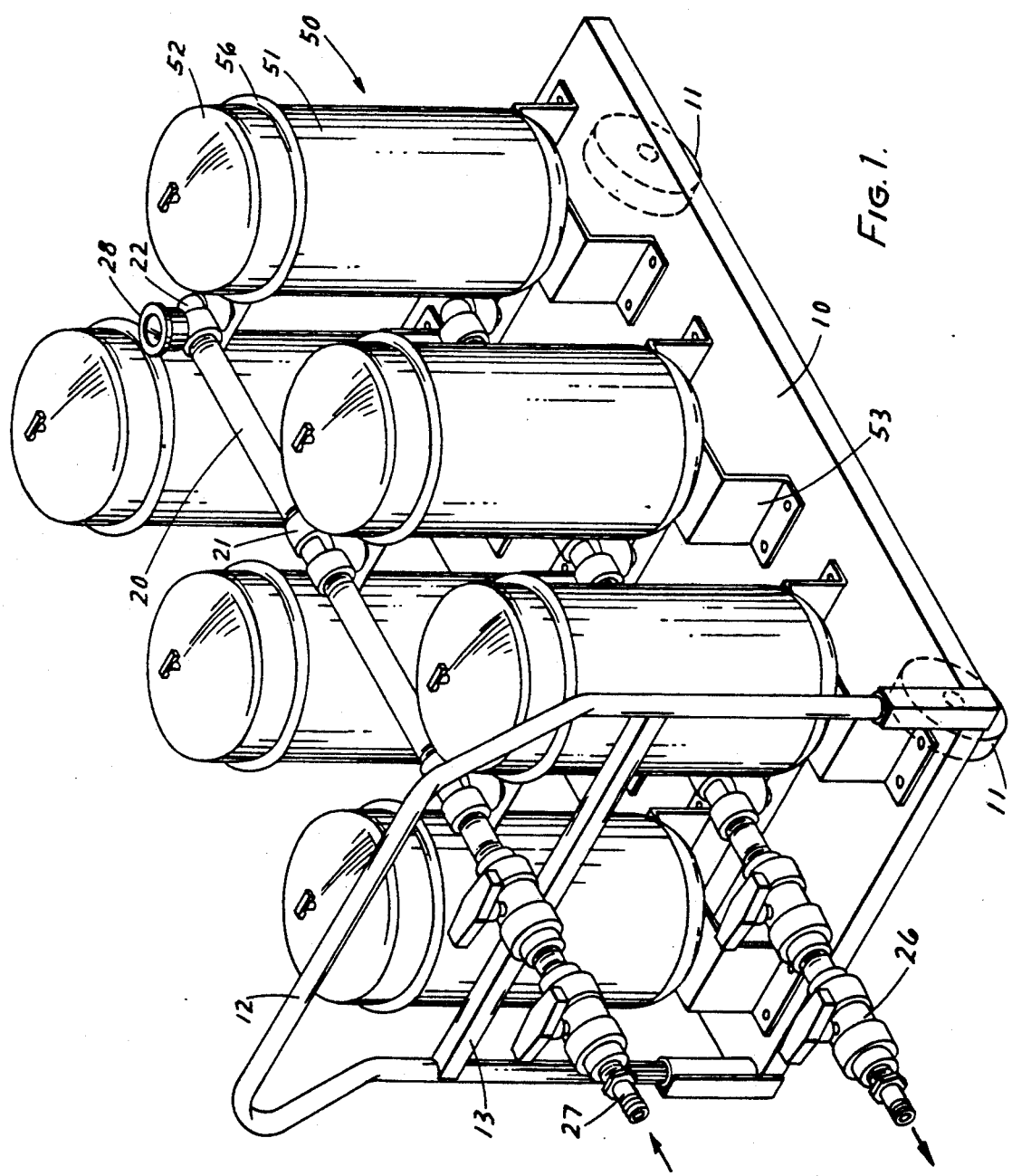
FIG. 1 is a perspective view of a portable, multi-element, parallel canister filter apparatus in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also it is to be understood that the phraseology and terminology employed herein is for the purpose of description and should not be regarded as limiting.

DETAILED DESCRIPTION OF THE PREFERRED EMBODIMENT OF THE INVENTION

Shown in the various figures is a portable, multi-element, parallel canister filter apparatus for filtering the dielectric fluid of an electric discharge machine.

A. Support Platform

Referring to FIG. 1, a plurality of filter canisters (50) and pipe (20) subassemblies are attached to a support platform (10). The support platform is of sufficient size and strength to maintain at least six filter canisters and two pipe subassemblies. The support platform may be a single metal piece construction or a frame of welded angle iron with transverse angle iron pieces spaced to support the filter canister. FIG. 1 depicts the single metal piece embodiment. The support platform is mounted upon a plurality of wheels (11), at least one of which is pivotally mounted to control direction and for ease of movement. Other means of movement control (not shown) could be used such as skids, rollers, air pressure blanket or legs. A handle (12) is mounted on the support platform to facilitate movement of the filter apparatus. One embodiment includes a transverse support bar (13) mounted to the handle and supports the inlet pipe subassembly.

B. Pipe Subassembly

Figure 4:
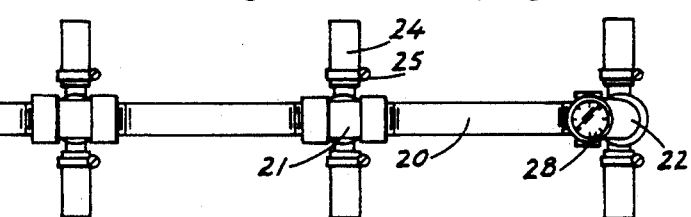
FIG. 4 is a top view of the pipe and hose subassembly for connecting the canisters in parallel.
Figure 3:
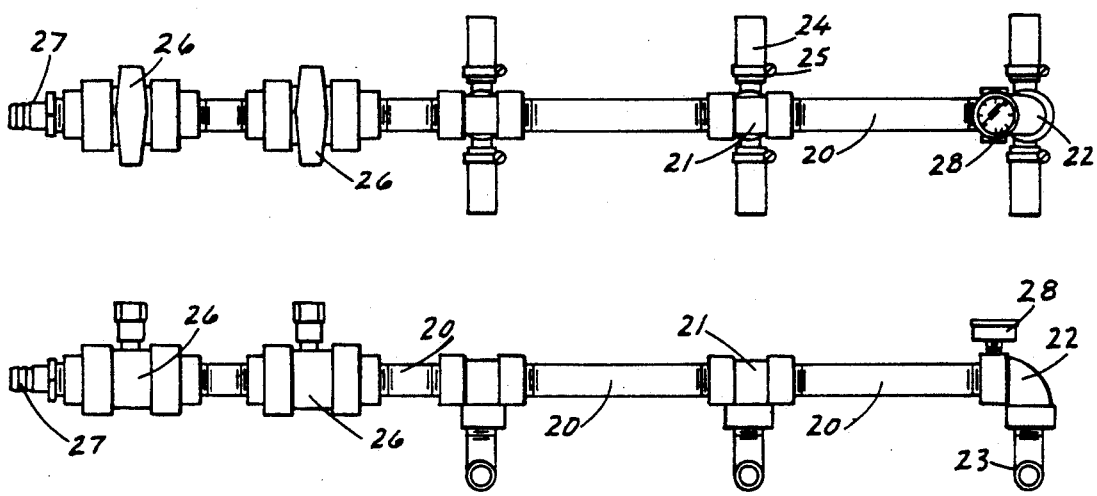
FIG. 3 is a side view of the pipe and hose subassembly for and connecting the canisters in parallel.

Referring to FIGS. 1, 3, and 4, the filter canisters (50) are connected to each other by a pair of pipe subassembly. One pipe subassembly functions as the inlet pipe and one pipe subassembly functions as the out pipe for the filter apparatus.

A pipe subassembly comprises a ninety degree elbow (22) connected to a pipe (20) member, connected to a Tee connector (21), connected to a pipe (20) member, connected to a Tee connector (21), connected to a pipe member, connected to a ball valve (26), connected to a pipe member, connected to a ball valve and connected to a hose barb (27). The elbow (22) and each Tee connector (21) have a Tee hose barb sealable flow connected to each barb as illustrated FIGS. 3 and 4. Each Tee hose has two ends, each of which end is connected to a braided hose (24) by a hose clamp (25).

A pipe subassembly may have a pressure gage (28) sealably flow interconnected to it preferably in the elbow (22).

The pipe subassembly is constructed of a material that is compatible with the EDM dielectric fluid, which in the disclosed invention is a poly vinyl chloride. The pipe subassembly for the inlet and outlet lines are of similar construction and connect three pairs of filter canisters, as shown in FIG. 1, in parallel. The pair of ball valves in each pipe subassembly facilitate the operation of the filter apparatus during the connection and disconnection of the filter apparatus of the electric discharge machine (not shown).

C. Filter Canister

Figure 2:
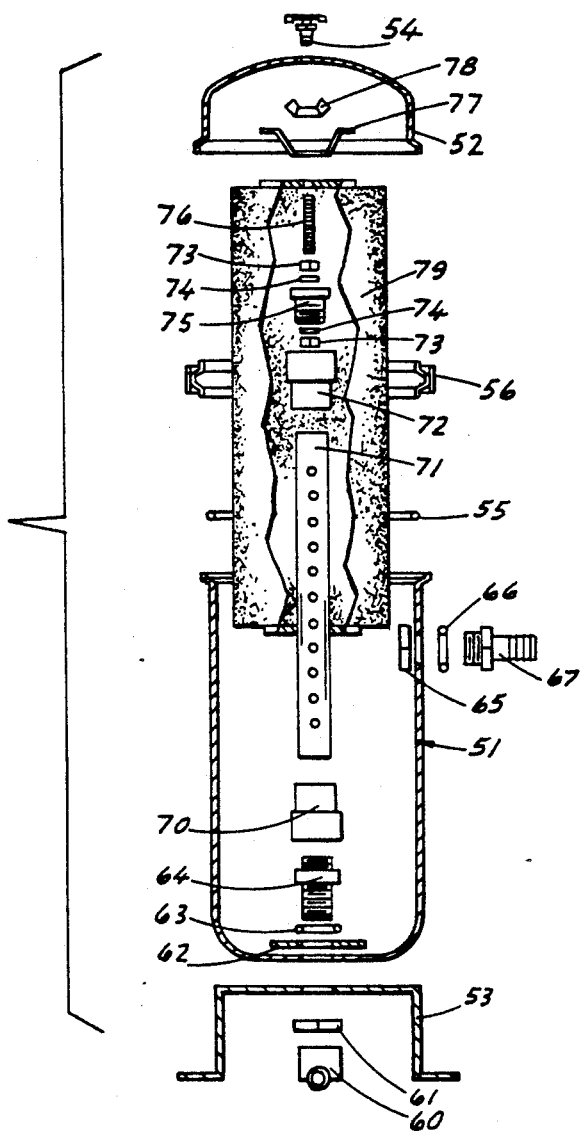
FIG. 2 is an exploded, cross-sectional view of one canister.

Referring to FIGS. 1 and 2, a plurality of filter canisters (50) are interconnected in parallel by the two pipe (20) subassemblies.

The preferred embodiment of the invention, as illustrated, has not less than six filter canisters orientated in a vertical position.

Referring to FIG. 2, each filter canister comprises a corrosion resistant filter tank (51) having an open end and a closed end. A filter tank cover (52) to which is attached and in communication with the interior portion of said filter tank an air release valve (54). Each filter canister (50) is mounted in a vertical orientation on a filter tank stand (53). The filter canister is removably secured to the tank stand by a threaded flange nipple (64) axially mounted through the closed end of the filter tank and the top of the filter stand. Said threaded flange nipple being secured in place by a first locking nut (61). Pressure mated between the flange nipple and the filter tank bottom and forming a flow seal is a gasket (62) and first O-ring (63). The flange nipple has an integral shoulder defining an O-ring grove in which the ridge first O-ring (63) is seated. The preferred embodiment uses a EDM dielectric fluid compatible sealing gel between the first gasket and the bottom of the filter tank. The preferred embodiment uses brass for the flange nipple (64) however any corrosion resistant and EDM dielectric fluid compatible material can be used. The flange nipple functions as the outlet to the filter tank and has an outlet elbow threadedly mounted on the flange nipple extending under the filter stand. In operation, the end of the braided hose (24) not attached to the pipe (20) subassembly is connected to the outlet elbow (60) by a hose clamp (25) and forming a flow communication with the outlet pipe assembly. An inlet hose barb (67) is mounted through the side wall of the filter tank (51) near the open end of the filter tank and in communication with the interior of said filter tank. The preferred embodiment is mounted through the side wall of the filter tank in a plane area thereby providing a flat surface for securing the inlet hose barb. Said inlet hose barb has an integral shoulder ridge defining an O-ring groove in which a second O-ring (66) is seated and pressure mated between said shoulder ridge and the exterior of the filter tank side wall and removable secured by a second locking nut (65). In operation, the end of the braided hose (24) not attached to the pipe (28) subassembly is connected to the inlet hose barb (67) by a hose clamp (25) and forming a flow communication with the inlet pipe subassembly. The tank cover (52) having a size and shape substantially equal to the open end of the filter tank (51) is removably attached and secured to the filter tank by a V-clamp ring (56). A flow seal is provided between the filter tank cover and the filter tank by an O-ring gasket (55) having substantially a circular cross-section and pressure mated between the filter tank and filter tank cover by said V-clamp ring.

Each filter canister (50) has mounted inside its filter tank a filter element subassembly comprising a first female slip-nut connector (70) adapted to slidedly mount or threadedly mount on the flange nipple (64) at the closed end of the filter tank. Removable and mated to the first female slip-nut connector is a tube (71) having a plurality of holes bored through the side wall of the tube. A hollow, paper filter cartridge (79) is mounted on the tube and maintained in axial alignment with the tube by a second female slip-nut connector (72). The filter cartridge-tube combination is secured to the filter tank by a connector (75) having an axially mounted threaded rod (76) mounted through the connector and secured by a first hex nut (73), washer (74), second hex-nut (73) clamping means. The paper filter cartridge is secured to the tube by a filter clamp (77) based against the filter cartridge by a wing nut (78) threadedly mounted on the threaded rod (76).

In operation, the invention is moved to the EDM machine and the inlet pipe subassembly is connected to the EDM by a means and the outlet pipe subassembly is connected to the EDM by a means. It should be understood that the invention can be connected to the EDM itself or to the dielectric fluid reserve tank. The ball valves (26) are opened thereby providing flow communications for the dielectric fluid with the filter cartridge through the inlet hose barbs (67), through the filter cartridges (79), into the tube (71), into the outlet elbow barb (60), into the outlet pipe (20) subassembly, through the ball valve (26) and back to the EDM reserve dielectric fluid tank.

Another aspect of the invention is that a second multi-element EDM filter system can be prepared and on standby. At such time as the EDM operator determines that a change of filters is necessary, the first filter system's valves can be closed, the inlet and outlet pipe subassemblies disconnected from the EDM machine and moved out of the way. The second filter system can be moved into position, the disconnect procedure reversed and the second filter system is connected to the EDM. While the EDM machine is operating with the new filter system the first system is cleaned. The V-clamps of each filter canister is released, the filter tank cover removed, the dirty filter cartridge removed after releasing the wing nut and filter clamp, replace nut of new filter cartridge and thereafter the canister opening steps are reversed. After all filter canisters are cleaned in the same manner, the portable filter is ready to be moved to the next EDM machine. It can be seen that this method of filter replacement is thus cost effective and less time consuming than other filter systems known in the art.

Thus, it should be apparent that there has been provided in accordance with the present invention a portable multi-element electric discharge machine filter system and a method for filtering the dielectric fluid used in wire electric discharge machines that satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications, and variations that fall within the spirit and scope of the appended claims.

I claim:

1. A portable multi-element canister fluid filter apparatus for filtering the dielectric fluid used in a wire electric discharge machine, said apparatus comprising:
   a. a support platform,
   b. a plurality of mounting brackets equidistantly spaced and removably fastened on the support platform,
   c. a plurality of filter canisters each comprising:
      1. a tank having a closed end and an open end with a removable lid wherein the lid and open end have concentric lips,
      2. an inlet fitting fastened through the filter tank wall by a second locking nut,
      3. a means for fastening the lid and the open end of the filter tank,
      4. a rigid, perforated tube having a female slip-nut connector mounted on each end of said tube, with one such end mounted on a flange nipple fitting and the opposing end of said tube having a threaded stud member assembly,
      5. a filter cartridge mounted on said tube,
      6. a filter clamp removably fastened on the threaded stud member of said tube,
      7. an outlet fitting fastened to the flange nipple fitting, which flanged nipple fitting extends through the tank and is in communication with the interior of the tank and a mounting bracket by a first locking nut,
   d. a means for flow interconnecting, in parallel, the inlet fittings of each filter canister, and
   e. a means for flow interconnecting, in parallel, the outlet fittings of each filter canister.

2. The apparatus of claim 1 whereby the removable lid has an air release valve mounted on it and in communication with the interior of the filter tank.

3. The apparatus of claim 1 whereby the filter cartridge is composed of paper.

4. The apparatus of claim 1 whereby the support platform is mounted on not less than three casters.

5. The apparatus of claim 1 wherein the support platform is mounted on a means to allow free movement of said apparatus.

* * * * *